United States Patent [19]

Hinton et al.

[11] Patent Number: 5,400,133
[45] Date of Patent: Mar. 21, 1995

[54] ALIGNMENT METHOD AND APPARATUS FOR OPTICAL IMAGING SYSTEMS

[75] Inventors: John H. Hinton, Ontario; Edward C. Bock, Webster, both of N.Y.

[73] Assignee: Xerox Corporation, Stamford, Conn.

[21] Appl. No.: 205,421

[22] Filed: Mar. 4, 1994

[51] Int. Cl.⁶ .............................................. G01B 11/00
[52] U.S. Cl. ................................... 356/138; 356/153; 359/216; 359/813
[58] Field of Search ............... 359/210, 216, 217, 218, 359/219, 813, 814; 356/138, 152, 399, 400, 153

[56] References Cited

U.S. PATENT DOCUMENTS

| | | | |
|---|---|---|---|
| 4,355,859 | 10/1982 | Herloski et al. | 356/153 |
| 5,111,476 | 5/1992 | Hollenbeck et al. | 372/107 |

FOREIGN PATENT DOCUMENTS

| | | | |
|---|---|---|---|
| 205305 | 9/1987 | Japan | 359/317 |
| 214712 | 9/1988 | Japan | 359/210 |
| 96622 | 4/1989 | Japan | 359/218 |
| 137210 | 5/1989 | Japan | 356/138 |

Primary Examiner—F. L. Evans

[57] ABSTRACT

An alignment mechanism is provided for adjusting the optical center line of scanning beams generated in a ROS system. The collimator lenses which collimates the output of a diode laser source are mounted within a lens barrel. The lens barrel is positioned so as to be biased against the sides of a housing in which the ROS components are located. The barrel has eccentric rings mounted along its circumference which, when rotated, inpart motion to the lens barrel so as to change the center line of the collimated beam output. This provides adjustment of the scan line center line at the image plane.

1 Claim, 3 Drawing Sheets

ALIGNMENT METHOD AND APPARATUS FOR OPTICAL IMAGING SYSTEMS

BACKGROUND AND MATERIAL DISCLOSURE STATEMENT

The present invention relates to optical imaging systems that sweep an output beam across an image plane surface as successive raster scan lines and, more particularly, to means for adjusting the optical center line of the scanning beams.

Optical imaging systems, such as printers, copiers, and facsimile machines which utilize a laser beam as a light source have come into wide use. A typical raster output system (ROS) output from a laser is collimated, focused by suitable optics, deflected from the facets of a rotating polygon scanner and scanned across a photoreceptor surface as modulated scan lines. Diode lasers have come to be preferred over gas lasers. A consistent problem has been the difficulty of aligning the collimated modulated diode laser outputs with the optical elements that are commonly mounted within a ROS housing. The alignment of the optical center line of the diode laser and the collimating lens with the center line of the collimating lens housing (barrel) has proved especially difficult. There are various prior art techniques for achieving this alignment; a useful summary of the references is contained in U.S. Pat. No. 5,111,476, whose contents are hereby incorporated by reference. Many of the techniques disclosed in this patent require an adhesive or glue to be applied to the optical elements to maintain a final alignment. The present invention is directed towards a mechanical alignment method which utilizes two pairs of eccentric rings located in grooves at each end of the collimator lens barrel. A rough initial alignment of diode to lens is implemented which leaves the optical and mechanical center lines of the barrel still out of specified alignment. The eccentric rings are rotated while viewing a scan line on a camera sensor located at an image plane until a final specific alignment is achieved. More particularly the present invention relates to a method for adjusting the optical center line of scanning beams generated in a Raster Output Scanner (ROS) system including the steps of:

generating a modulated laser output beam,
collimating the modulated laser output beam by means of collimating lens elements mounted with a lens barrel to produce a collimated output beam,
scanning the collimated output beam across the surface of an image plane as a series of raster scan lines and
moving said lens barrel to change the optical center line of the collimated output beam until the scan lines are centered along a desired optical center line.

DESCRIPTION OF THE INVENTION

Figure 1:
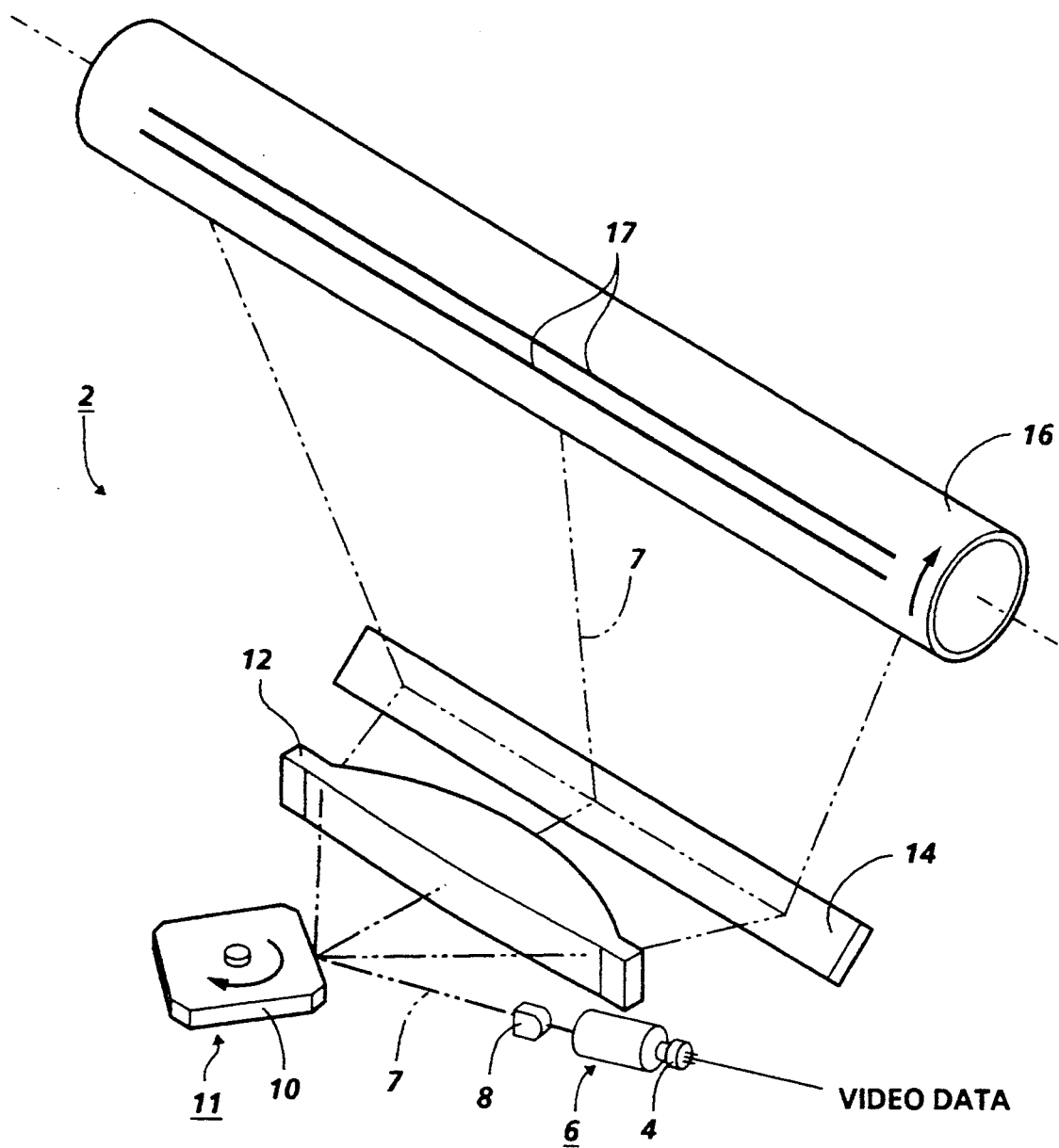
FIG. 1 is a perspective view of a raster output scanner (ROS) which includes a collimator assembly used to provide adjustment to the system center line.

FIG. 1 shows a raster output scanning (ROS) system 2 which sweeps modulated scan lines onto the surface of a photoreceptor.

Figure 2:
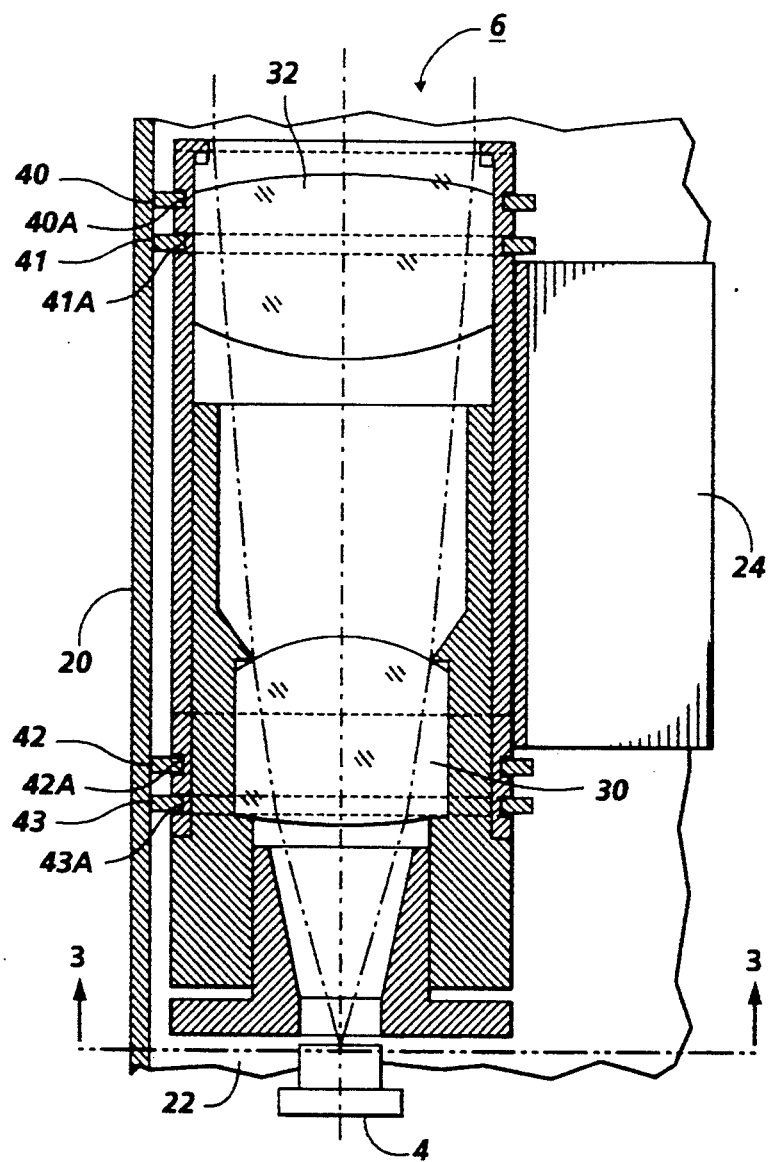
FIG. 2 is top view of a portion of the optical system which comprises the diode and the collimator lens barrel.

Diode laser 4 is directly modulated by video data to provide a modulated output beam which is collimated and swept across a photosensitive surface by optical components housed in a ROS housing (partially shown in FIG. 2). The laser output passes through a collimator lens assembly 6, which typically comprises a plurality of collimating lens elements forming a collimated light output represented by a central ray along axis 7. The collimated modulated beam is focused by cylindrical lens 8 onto facets 10 of rotating polygon 11. After reflection from facets 10, the beam passes through an $f\theta$ lens 12 which provides imaging and focus corrections to the beam; and, after reflection from a mirror 14, scans across the surface of a photoreceptor medium such as, for example, a drum 16 forming a series of scan lines 17. Photoreceptor drum 16 moves in a slow scan direction substantially perpendicular to the fast scan direction. The alignment of the ROS system 2 so that scan lines 17 are formed within specified tolerances is achieved by adjustment of the lens of barrel 6 in a manner to be described below.

Figure 3:
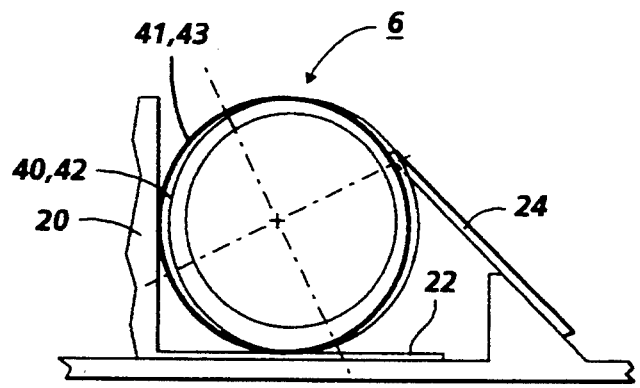
FIG. 3 is an end view of FIG. 2.
Figure 4A:
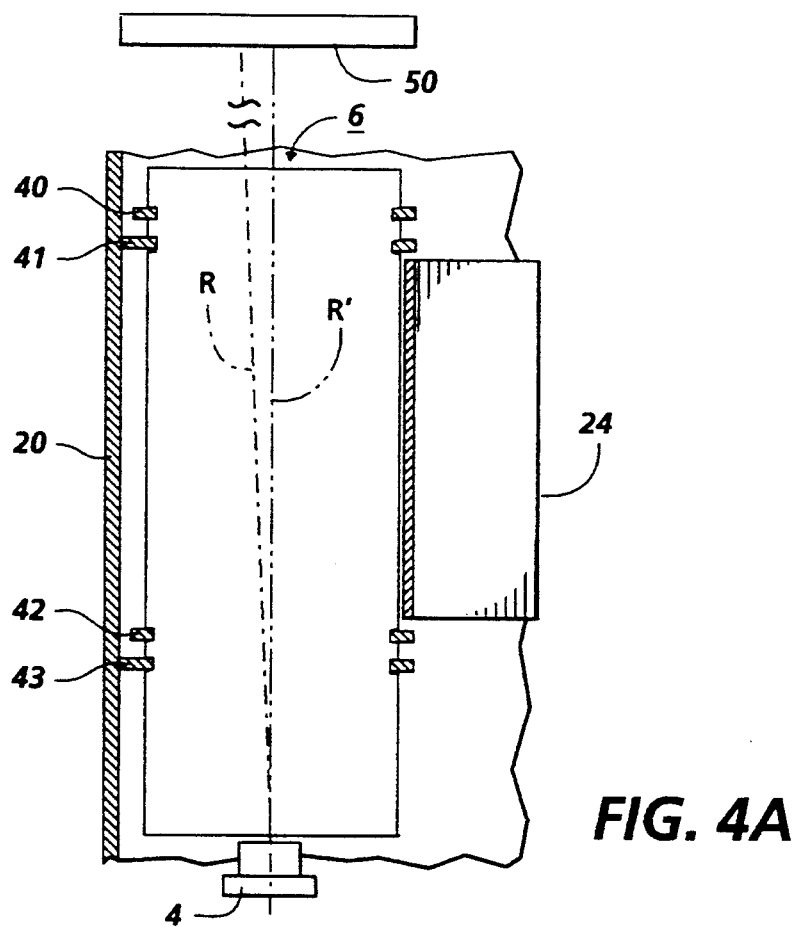
FIG. 4A is a top view of FIG. 2 showing an out of alignment optical center line.
Figure 4B:
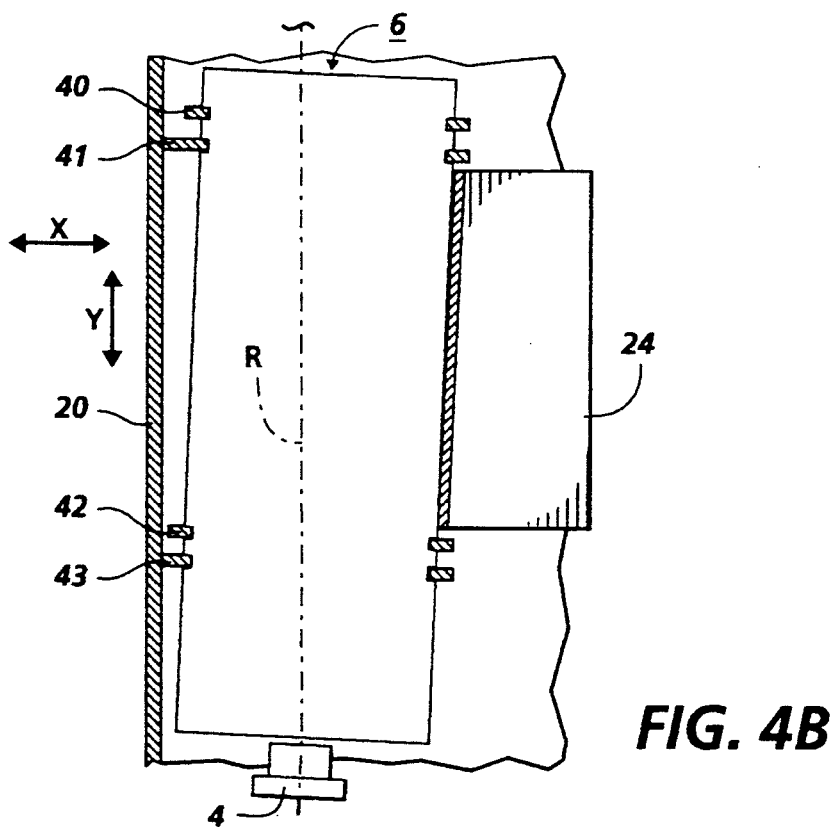
FIG. 4B is a view of FIG. 4A showing an adjusted center line.

It is assumed that all the other components of the ROS system 2 (the diode 4 lens 8, polygon scanner 11, lens 12, mirror 14) are fixed in place. FIGS. 2 and 3 show a top and an end view respectively of lens assembly 6 (commonly referred to as a lens barrel) held in position against side wall 20 and bottom wall 22 of a ROS housing by a leaf spring 24. Walls 20, 22 meet at a right angle as shown in FIG. 3. Laser diode 4 has been mounted into a heat sink, not shown, and initially focused. Lens barrel 6 is seated in the angle formed by the walls and is in contact with them by means of pairs of eccentric rings 40, 42 and 41, 43 rotatably mounted in grooves 40A, 42A and 41A, 43A, respectively, formed on the outside circumference of the lens barrel frame. Rings 40, 42 contact bottom wall 22; rings 41, 43 contact side wall 20. Lens barrel 6 further includes two lens elements, single lens 30 and doublet lens 32. These lenses, at initial set up, are placed within the lens barrel and fixed in position against hard stop surfaces. At this point an initial scan operation is enabled with a scan line beam swept across a CCD camera which is positioned at the image plane of FIG. 1. The scan line coordinates set on the camera are within the required degree of tolerance. It is assumed that the scan line image has an out of alignment error due to the optical center line of the lenses 30, 32 being out of alignment with the mechanical center line of barrel 6. This situation is shown in FIG. 4A which also shows a CCD camera 50 at the image plane. A principal ray R representing the beam output from laser diode 4 is misaligned from the optical center line R' which represents the center line of the sweeping beam which will form a centrally positioned scan line at the camera 50. According to the invention and referring to FIGS. 2 and 3, rings 40, 43 are rotated while visually observing camera 50. As the rings 41, 43 are rotated, lens barrel 6 is provided with a component of motion in the side to side (X) direction. Rotation of rings 40, 42 provide barrel 6 with an up-and-down component of motion Y (into and out of the page). It will be appreciated that a combination of ring rotations provides a 3-D motion to the barrel until the final desired alignment of the center line is measured at camera 50 and center line R is moved to the R' position shown in FIG. 4B. The instant position of barrel 6 is held by the biasing force provided by spring 24.

It will be appreciated that the misalignment of scan line can be caused by other errors throughout the ROS system in addition to, or separate from the lens barrel misalignment. The eccentric ring rotation will compensate for any and all such errors. Once this initial alignment is complete, the ROS system is operational. Additional adjustments can be made during regular intervals during operation to maintain the optical center line.

While the embodiment disclosed herein is preferred, it will be appreciated from this teaching that various alternative, modifications, variations or improvements therein may be made by those skilled in the art, which are intended to be encompassed by the following claims:

We claim:

1. A Raster Output Scanner (ROS) system comprising: a diode laser for generating modulated output beams, collimating lens means mounted with a lens barrel to collimate said laser output beams the lens barrel held in position against two adjoining walls of a ROS housing, optical means for sweeping said modulated and collimated beams along a scan path having an optical center line to provide successive raster scan lines in an imaging surface, said lens barrel including means for adjusting the position of the lens barrel relative to the diode laser and the optical means so as to provide an adjustment to said optical center line, said means for adjusting the position of said lens barrel including eccentric rings contacting said two adjoining walls of the ROS housing, rotation of the rings providing a 3-dimensional motion to the lens barrel.

* * * * *